US012764652B2

(12) United States Patent
Fan

(10) Patent No.: US 12,764,652 B2
(45) Date of Patent: Oct. 13, 2026

(54) CELL DETERMINING METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 340 days.

(21) Appl. No.: 18/214,066

(22) Filed: Jun. 26, 2023

(65) Prior Publication Data

US 2023/0337084 A1 Oct. 19, 2023

Related U.S. Application Data

(63) Continuation of application No. PCT/CN2021/070948, filed on Jan. 8, 2021.

(51) Int. Cl.
*H04W 48/20* (2009.01)
*H04W 48/18* (2009.01)

(52) U.S. Cl.
CPC .......... *H04W 48/20* (2013.01); *H04W 48/18* (2013.01)

(58) Field of Classification Search
CPC .............................. H04W 36/14; H04W 48/18
See application file for complete search history.

(56) References Cited

U.S. PATENT DOCUMENTS

2011/0111759 A1* 5/2011 Chami .................. H04W 48/20 455/436
2020/0107218 A1* 4/2020 Wang .................... H04W 36/18
(Continued)

FOREIGN PATENT DOCUMENTS

CN 109819433 A 5/2019
CN 110831109 A 2/2020
(Continued)

OTHER PUBLICATIONS

3GPP TS 38.304 V16.2.0 (Sep. 2020); Technical Specification Group Radio Access Network; NR; User Equipment (UE) procedures in Idle mode and RRC Inactive state (Release 16).
(Continued)

*Primary Examiner* — Fabricio R Murillo Garcia
(74) *Attorney, Agent, or Firm* — BAYES PLLC

(57) ABSTRACT

The present disclosure relates to the field of mobile communications. Disclosed are a cell determining method and apparatus, a device, and a storage medium. The method comprises: obtaining a cell by means of searching; if the cell is determined to belong to a third-party network, determining the cell as a target cell, wherein the third-party network is another network other than a subscribed network of a terminal device, and the target cell is used for cell selection or cell reselection by the terminal device. The deployment type of a communication network is expanded. The restriction that a terminal device can only perform communication on the basis of a subscription party network is broken, the manner in which the terminal device performs communication on the basis of the communication network is expanded, and the communication quality of the terminal device for communication is improved.

20 Claims, 3 Drawing Sheets

(56) References Cited

U.S. PATENT DOCUMENTS

| | | | | |
|---|---|---|---|---|
| 2020/0221372 | A1 | 7/2020 | Shih et al. | |
| 2020/0245235 | A1 | 7/2020 | Chun | |
| 2020/0374947 | A1* | 11/2020 | Jin | H04W 88/085 |
| 2022/0141756 | A1* | 5/2022 | Pan | H04W 48/12 370/328 |
| 2022/0167260 | A1* | 5/2022 | Chun | H04W 60/04 |
| 2022/0174575 | A1* | 6/2022 | Yang | H04W 36/0016 |
| 2022/0174762 | A1* | 6/2022 | Pan | H04W 12/06 |

FOREIGN PATENT DOCUMENTS

| | | | |
|---|---|---|---|
| CN | 111726846 | A | 9/2020 |
| CN | 111866972 | A | 10/2020 |
| CN | 112042225 | A | 12/2020 |
| EP | 3952468 | B | 2/2022 |
| WO | 2020194636 | A1 | 10/2020 |
| WO | 2020204536 | A1 | 10/2020 |

OTHER PUBLICATIONS

Qualcomm, "Offline discussion 105: PRN—38304 open issues—first round", R2-2005795, 3GPP TSG-RAN WG2 Meeting #110-e Electronic, Jun. 1-12, 2020.

International Search Report issued in international application No. PCT/CN2021/070948, mailed Aug. 30, 2021.

Written Opinion of the International Searching Authority issued in international application No. PCT/CN2021/070948, mailed Aug. 30, 2021.

Extended European Search Report issued in corresponding European application No. 21912446.8, mailed Apr. 30, 2024.

3GPP TR 23.700-07 V1.2.0 (Nov. 2020); Technical Specification Group Services and System Aspects; Study on enhanced support of non-public networks (Release 17).

First Office action issued in corresponding Chinese Application No. 202410249145.9, dated Aug. 7, 2026, 22 pages.

Notice of Priority Review of Patent Application issued in corresponding Chinese Application No. 202410249145.9, dated Jul. 22, 2026, 12 pages.

Extended European Search Report issued in corresponding European Application No. 26158199.5. dated Jun. 22, 2026, 13 pages.

* cited by examiner

CELL DETERMINING METHOD AND APPARATUS, DEVICE, AND STORAGE MEDIUM

CROSS-REFERENCE TO RELATED APPLICATIONS

The present application is a continuation of International Application No. PCT/CN2021/070948, entitled "CELL DETERMINING METHOD AND APPARATUS, DEVICE, AND STORAGE MEDIUM", filed on Jan. 8, 2021, which claims the benefit of priority to International Application No. PCT/CN2020/141359, titled "CELL DETERMINING METHOD, APPARATUS, DEVICE, AND STORAGE MEDIUM", filed on Dec. 30, 2020, both of which are incorporated herein by reference in their entireties.

TECHNICAL FIELD

The present disclosure relates to the field of mobile communications, and in particular to a cell determining method and apparatus, a device, and a storage medium.

BACKGROUND

Currently, in the mobile communication field, although a terminal device can perform communication based on a mobile communication network, it is necessary for the terminal device to first subscribe the mobile communication network of an operator of a Subscriber Identity Module (SIM) installed, and store the subscribed network identity corresponding to the subscribed network. If the terminal device finds a cell through searching, it compares the network identity corresponding to the cell found through searching with the subscribed network identity, and if it is determined that the network identity corresponding to the cell matches the subscribed network identity, the terminal device can access the cell and perform communication based on the cell. With this method, the terminal device can only access the cell of the subscribed network and perform communication based on the subscribed network, which has limitations.

SUMMARY

The embodiments of the present disclosure provides a cell determining method and apparatus, a device, and a storage medium.

According to an aspect of the present disclosure, a cell determining method is provided, which is applied to a terminal device, and the method includes:

performing searching to find a cell; if it is determined that the cell belongs to a third-party network, determining the cell as a target cell; where the third-party network is a network other than a subscribed network of the terminal device, and the target cell is used for the terminal device to perform cell selection or cell reselection.

According to an aspect of the present disclosure, a cell determining method is provided, which is applied to a network device, and the method includes:

sending first configuration information and/or third configuration information to a terminal device; the first configuration information includes configuration information corresponding to a third-party network, or includes configuration information corresponding to a subscribed network and configuration information corresponding to the third-party network, and the third configuration information includes the configuration information corresponding to the subscribed network.

According to an aspect of the present disclosure, a cell determining apparatus is provided, which is applied to a terminal device, and the apparatus includes:

a search module, configured to perform searching to find a cell; and a determining module, configured to determine the cell as a target cell in a case where it is determined that the cell belongs to a third-party network;

wherein the third-party network is a network other than a subscribed network of the terminal device, and the target cell is used for the terminal device to perform cell selection or cell reselection.

According to an aspect of the present disclosure, a cell determining apparatus is provided, which is applied to a network device, and the apparatus includes:

a sending module, configured to send first configuration information and/or third configuration information to a terminal device;

wherein the first configuration information includes configuration information corresponding to a third-party network, or includes configuration information corresponding to a subscribed network and the configuration information corresponding to the third-party network, and the third configuration information includes the configuration information corresponding to the subscribed network.

According to an aspect of the present disclosure, a network device is provided, and the network device includes:

a processor; a transceiver coupled to the processor; and a memory for storing program codes executable by the processor;

wherein the processor is configured to load and execute the executable program codes to implement the cell determining method as described in the above aspects.

According to an aspect of the present disclosure, a terminal device is provided, and the terminal device includes:

a processor; a transceiver coupled to the processor; and a memory for storing program codes executable by the processor;

wherein the processor is configured to load and execute the executable program codes to implement the cell determining method as described in the above aspects.

According to an aspect of the present disclosure, there is provided a computer-readable storage medium having stored thereon executable program codes, and the executable program codes are loaded and executed by the processor to implement the cell determining method as described in the above aspects.

According to an aspect of the present disclosure, a chip is provided, the chip includes a programmable logic circuit and/or program instructions, and the chip, when running on a terminal device or a network device, is configured to implement the cell determining method as described in the above aspects.

According to an aspect of the present disclosure, an embodiment of the present disclosure provides a computer program product, and the computer program product, when being executed by a processor of a terminal device or a network device, is configured to implement the cell determining method as described in the above aspects.

BRIEF DESCRIPTION OF THE DRAWINGS

In order to clearly describe the technical solutions in the embodiments of the present disclosure, the accompanying drawings which are referred to in the description of the embodiments will be briefly described below. Obviously, the drawings in the following description show merely some embodiments of the present disclosure, and a person of ordinary skill in the art may still derive other drawings from these accompanying drawings without creative efforts.

DETAILED DESCRIPTION

In order to make the objectives, technical solutions, and advantages of the present disclosure more clear, the implementations of the present disclosure will be further described in detail below in conjunction with the accompanying drawings.

It can be understood that the terms "first", "second" and the like used in the present disclosure may be used to describe various concepts herein, and these concepts are not limited by these terms, unless otherwise specified. These terms are only used to distinguish one concept from another.

First, the terms involved in the embodiments of the present disclosure are explained.

(1) NR NPN network: NPN networks are categorized into Stand-alone Non-public Networks (SNPN) and Closed Access Group (CAG) networks, a SNPN is identified using a Public Land Mobile Network (PLMN) Identity (ID) and a NID, and a CAG network is identified using a PLMN ID and a CAG ID.

(2) Cell: it is a physical cell, one physical cell includes multiple PLMNs, and one PLMN can simultaneously support any combination of the common public network, the SNPN, and the CAG network. For example, a PLMN may separately support the common public network, the SNPN, or the CAG network, or may support that one PLMN is shared by the common public network and the SNPN, or that one PLMN is shared by the common public network, the SNPN and the CAG network at the same time. For example, as shown in FIG. 1, FIG. 1 shows a combination relationship between PLMNs included in a physical cell and the common public network(s), the SNPN(s), and the CAG network(s) corresponding to each PLMN.

Figure 1:
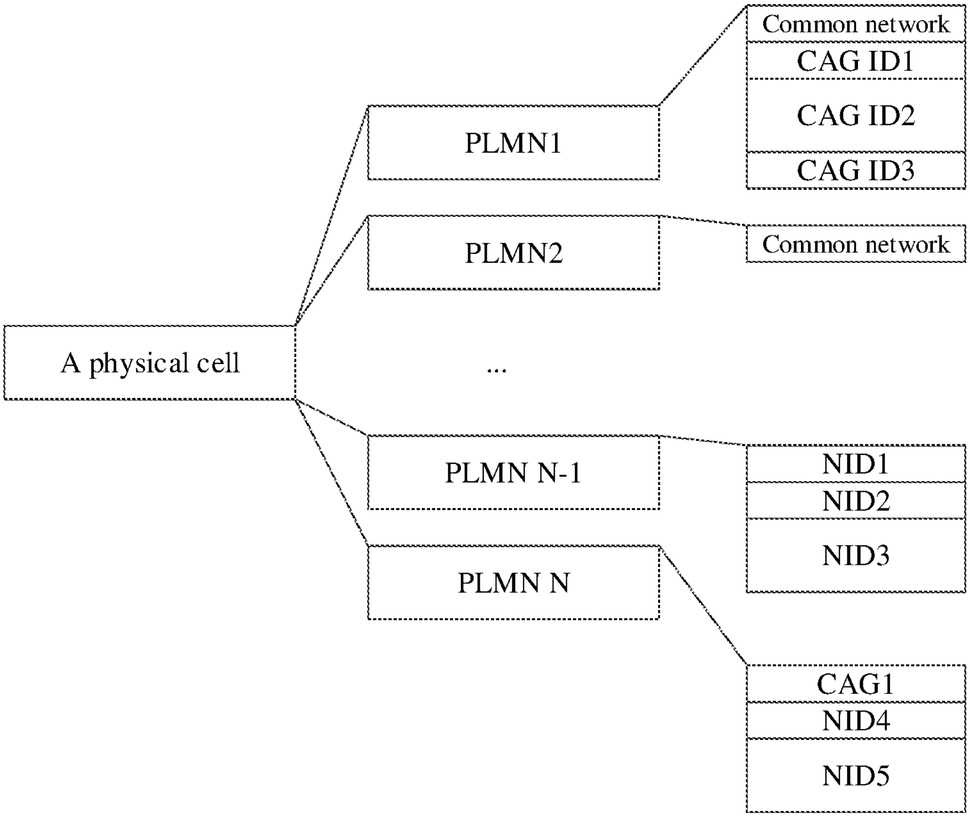
FIG. 1 shows a physical cell structure relationship provided by an exemplary embodiment of the present disclosure.

As shown in FIG. 1, the common public network and three different CAG sub-networks are deployed in PLMN1 cell at the same time, and only three SNPN sub-networks are deployed in PLMN N−1 cell, which indicates that any network sharing combinations of the common public network, the SNPN and the CAG network can be deployed freely in the PLMN, but it is specified in the agreement that each of the numbers of the standalone SNPN sub-networks, standalone CAG sub-networks or SNPN plus CAG sub-networks deployed in one physical cell cannot exceed 12.

Figure 2:
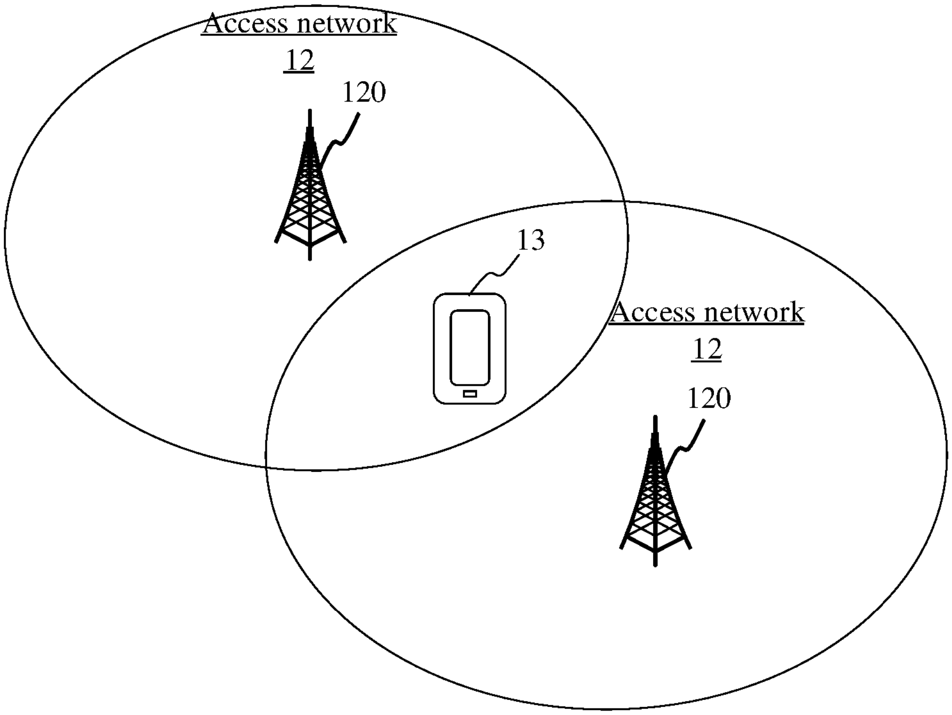
FIG. 2 shows a block diagram of a communication system provided by an exemplary embodiment of the present disclosure.

FIG. 2 shows a block diagram of a communication system provided by an exemplary embodiment of the present disclosure. The communication system may include an access network 12 and a terminal device 13.

The access network 12 includes several network devices 120. The network device 120 may be a base station, which is a device deployed in an access network to provide wireless communication functions for terminal devices. The base station may include various forms of macro base stations, micro base stations, relay stations, access points, and so on. In systems using different radio access technologies, the names of devices with base station functions may be different. For example, in a LTE system, they are called eNodeB or eNB; and in a 5G NR system, they are called gNodeB or gNB. With the evolution of communication technology, the expression of "base station" may change. For the sake of convenience, in the embodiments of the present disclosure, the above-mentioned devices for providing wireless communication functions for the terminal devices 13 are collectively referred to as an access network device.

The terminal device 13 may include various handheld devices, in-vehicle devices, wearable devices, computing devices or other processing devices connected to wireless modems that have the wireless communication function, as well as various forms of User Equipment, Mobile Stations (MSs), terminal devices, etc. For ease of description, the devices mentioned above are collectively referred to as terminal devices. The access network device 120 and the terminal device 13 communicate with each other through a certain radio interface technology, such as a Uu interface.

The technical solutions of the embodiments of the present disclosure can be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, an Universal Mobile Telecommunication System (UMTS), a Global Interoperability for Microwave Access (WiMAX) communication system, Wireless Local Area Networks (WLAN), Wireless Fidelity (Wi-Fi), next-generation communication systems, other communication systems, or the like.

Generally, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, Vehicle to everything (V2X) systems, etc. The embodiments of the present disclosure can also be applied to these communication systems.

Figure 3:
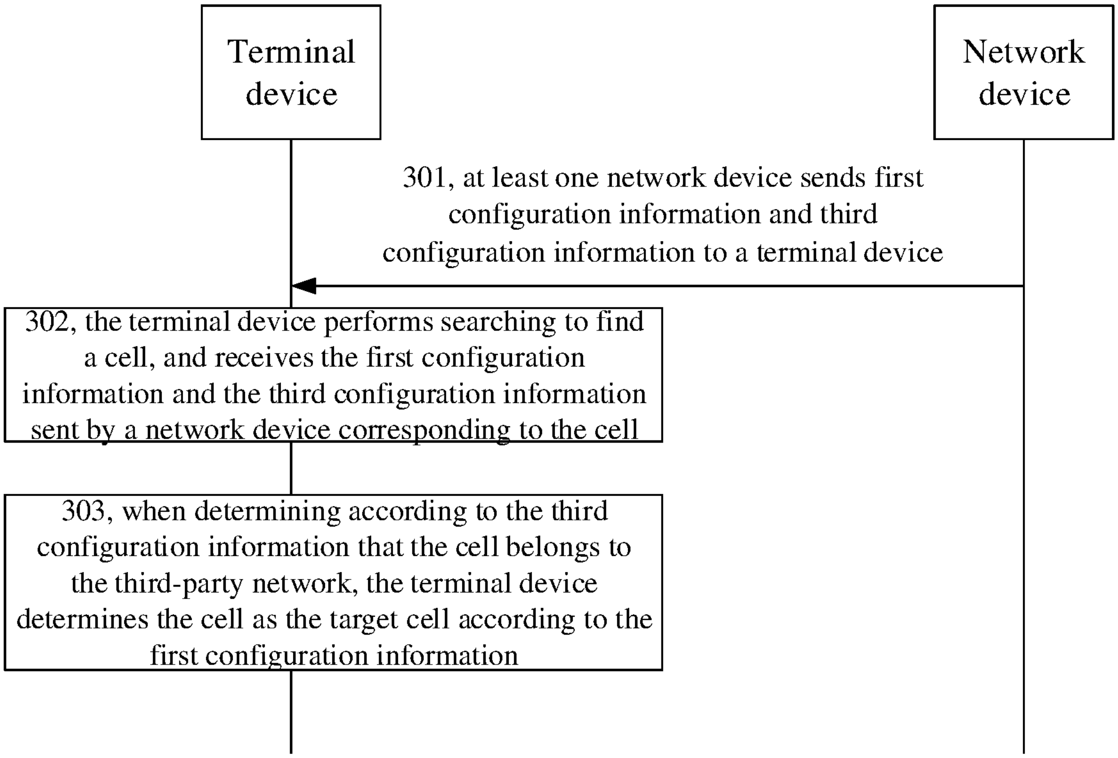
FIG. 3 shows a flowchart of a cell determining method provided in an exemplary embodiment of the present disclosure.

FIG. 3 shows a flowchart of a cell determining method provided by an exemplary embodiment of the present disclosure, which is applied in a network device and a terminal device, and the method includes at least some of the following contents.

In 301, at least one network device sends first configuration information and third configuration information to a terminal device.

In an embodiment of the present disclosure, each network device will cover a cell, and each network device will continuously send the first configuration information and the third configuration information to terminal devices in the cell covered by the network device. If the terminal device can find any cell through search, it obtains the first configuration information and the third configuration information sent by the network device corresponding to the cell.

The first configuration information includes configuration information corresponding to a third-party network, and the first configuration information is used for the terminal device to determine whether it can access a cell belonging to the third-party network. The third configuration information includes configuration information corresponding to a subscribed network, and the third configuration information is used for the terminal device to determine whether the cell found through search belongs to a third-party network. The third-party network is a network other than the subscribed network of the terminal device.

In 302, the terminal device performs searching to find a cell, and receives the first configuration information and the third configuration information sent by a network device corresponding to the cell.

In an embodiment of the present disclosure, if the terminal device is located in a cell covered by the network device, after finding the cell through search, the terminal device obtains the first configuration information and the third configuration information sent by the network device corresponding to the cell, and the terminal device determines, based on the third configuration information, whether the cell belongs to a third-party network, and determines, based on the first configuration information, whether it can access the cell covered by the network device.

It should be noted that the embodiment of the present disclosure are described only in examples where the network device sends the first configuration information and the third configuration information to the terminal device and the terminal device receives the first configuration information and the third configuration information. In another embodiment, the network device sends the first configuration information to the terminal device, and the terminal device receives the first configuration information sent by the network device, and the first configuration information includes the configuration information corresponding to the subscribed network and the configuration information corresponding to the third-party network. Determining by the terminal device whether the cell found through search belongs to the third-party network is also performed by obtaining the first configuration information sent by the network device, and the determining method is similar to those in the following step 303, which will not be described in detail here, and this applies to the whole description, unless otherwise indicated.

Alternatively, in another embodiment, the network device will also send the third configuration information to the terminal device. After receiving the third configuration information, determining by the terminal device whether the found cell belongs to the third-party network is also performed by obtaining the third configuration information sent by the network device. In a case where the terminal device determines that the cell found through search belongs to the third-party network, it can determine the cell as a target cell.

In 303, in a case where the terminal device determines according to the third configuration information that the cell belongs to the third-party network, the terminal device determines the cell as the target cell according to the first configuration information.

The target cell is used for the terminal device to perform cell selection or cell reselection.

The terminal device can identify and determine that the cell found through the search belongs to the third-party network according to the third configuration information, and may then determine the cell as the target cell according to the first configuration information.

In an embodiment of the present disclosure, the terminal device stores an identity of the subscribed network, and the third configuration information broadcast by the cell also includes the network identity, so the terminal device can determine whether the cell belongs to the third-party network according to the third configuration information. Determining by the terminal device that the cell found through the search belongs to the third-party network includes any of the following.

First case: any network identity included in the third configuration information broadcast by the cell does not match any subscribed network identity maintained by the terminal device.

In the present disclosure, a cell may belong to a third-party network, or belong to a subscribed network. Since the terminal device maintains the subscribed network identity, the terminal device determines whether the cell belongs to the third-party network by determining whether the network identity included in the third configuration information matches the subscribed network identity maintained by the terminal device.

The terminal device compares the network identities included in the third configuration information with the subscribed network identities maintained by itself, and if it determines that any network identity included in the third configuration information does not match any network identity maintained by the terminal device, it determines that this cell belongs to the third-party network. For example, the first case of determining that the cell belongs to the third-party network is as shown in Table 1:

TABLE 1

| PLMN or SNPN network identity information included in third configuration information | subscribed network identity maintained by terminal device |
|---|---|
| PLMN ID 1 | PLMN ID 4 |
| PLMN ID 2 | PLMN ID 5 |
| PLMN ID 3 | SNPN ID 3 |
| SNPN ID 1 | SNPN ID 4 |
| SNPN ID 2 | SNPN ID 5 |

Second case: at least one network identity included in the third configuration information broadcast by the cell matches at least one subscribed network identity maintained by the terminal device, but a tracking area corresponding to a tracking area identity associated with the matching network identity is forbidden from being accessed.

In an embodiment of the present disclosure, even if at least one network identity included in the third configuration information broadcast by the cell matches at least one subscribed network identity maintained by the terminal device, if the tracking area corresponding to the tracking area identity associated with the matching network identity is forbidden from being accessed, the terminal device cannot access the tracking area associated with the subscribed network, and the cell should also be determined as belonging to the third-party network at this time. For example, the second case of determining that the cell belongs to the third-party network is as shown in Table 2:

TABLE 2

| PLMN or SNPN network identity list information included in third configuration information and associated tracking area identity | | Subscribed network identity maintained by terminal device and associated access-forbidden tracking area | |
|---|---|---|---|
| PLMN ID 1 | Tracking Area TA 1 | PLMN ID 1 | Tracking Area TA 1 |
| PLMN ID 2 | Tracking Area TA 3 | PLMN ID 4 | Tracking Area TA 2 |
| PLMN ID 3 | Tracking Area TA 1 | SNPN ID 3 | None |
| SNPN ID 1 | Tracking Area TA 4 | SNPN ID 1 | Tracking Area TA 4 |
| SNPN ID 2 | Tracking Area TA 5 | SNPN ID 5 | None |

Third case: at least one PLMN network identity included in the third configuration information broadcast by the cell matches at least one PLMN network identity maintained by the terminal device, but CAG information associated with the matching PLMN network identities do not match with each other.

The PLMN network identity is associated with the CAG information, and the terminal device needs to access the cell according to the CAG information, so if at least one PLMN network identity included in the third configuration information matches at least one PLMN network identity maintained by the terminal device, but the CAG information associated with matching PLMN network identities does not match, the terminal device determines that the terminal device cannot access the cell corresponding to the subscribed network, and determines that the cell belongs to the third-party network.

In some embodiments, in the third case, that the CAG information associated with the matching PLMN network identities do not match with each other includes any of the following cases:

(1) The CAG network identity associated with the identity of the PLMN network subscribed by the terminal device does not match the CAG network identity associated with the PLMN network identity in the third configuration information.

(2) The identity of the PLMN network subscribed by the terminal device is not associated with a CAG network identity, and the PLMN network identity in the third configuration information is associated with a CAG network identity.

Even if the PLMN network identity in the third configuration information is associated with the CAG network identity, since the identity of the PLMN network subscribed by the terminal device is not associated with any CAG network identity, the terminal device cannot find the CAG network identity associated with the PLMN network identity in the third configuration information. Therefore, the terminal device determines that the CAG information associated with the matching PLMN network identities does not match.

(3) An indication bit of CAG-only (an indication bit identity) associated with the PLMN network identity subscribed by the terminal device is a first identity, and the PLMN network identity in the third configuration information is not associated with any CAG network identity.

The first identity is "true" or other identities.

For example, the third case of determining that the cell belongs to the third-party network is as shown in Table 3:

TABLE 3

| PLMN network identity included in third configuration information and associated CAG network identity | | Subscribed PLMN network identity maintained by the terminal and associated CAG network identity and CAG-only indication bit information | | |
|---|---|---|---|---|
| PLMN ID 1 | CAG ID 1<br>CAG ID 2 | PLMN ID 1 | CAG ID 3<br>CAG ID 4 | CAG-only indication bit is of value 'false' |
| PLMN ID 2 | CAG ID 1 | PLMN ID 2 | None | No CAG-only indication bit |
| PLMN ID 3 | None | PLMN ID 3 | CAG ID 1 | CAG-only indication bit is of value 'true' |

PLMN ID 1 is used to indicate case (1), PLMN ID 2 is used to indicate case (2), and PLMN ID 3 is used to indicate case (3).

The first point to be noted is that the network identities in the third configuration information are stored in the form of a network identity list. The network identities maintained in the terminal device are stored in the form of a network identity list.

The second point to be noted is that the third configuration information includes the PLMN network identity and/or the SNPN network identity.

In the case that the third configuration information includes the PLMN network identity, the first case is: the terminal device compares the PLMN network identities included in the third configuration information with the PLMN network identities maintained by itself, respectively, and if it is determined that any of PLMN network identities included in the third configuration information does not match any of the PLMN network identities maintained by the terminal device, it is determined that the cell belongs to the third-party network.

The second case is: even if at least one PLMN network identity included in the third configuration information broadcast by the cell matches at least one PLMN network identity maintained by the terminal device, if a tracking area corresponding to the tracking area identity associated with the matching PLMN network identity is forbidden from being accessed, the terminal device cannot access the tracking area, and the cell should also be determined as belonging to the third-party network.

If the third configuration information includes the SNPN network identity, the first case is: the terminal device compares the SNPN network identities included in the third configuration information with the SNPN network identities maintained by itself, respectively, and if it is determined that any of the SNPN network identities included in the third configuration information does not match any of the SNPN network identities maintained by the terminal device, it is determined that the cell belongs to the third-party network.

The second case is: even if at least one SNPN network identity included in the third configuration information broadcast by the cell matches at least one SNPN network identity maintained by the terminal device, if a tracking area corresponding to the tracking area identity associated with the matching SNPN network identity is forbidden from being accessed, the terminal device cannot access the tracking area, and the cell should also be determined as belonging to the third-party network.

In the embodiments of the present disclosure, it determines whether the cell obtained from scan belongs to a third-party network in the above manner, which can improve the accuracy of the determination by the terminal device that the cell obtained from scan belongs to the third-party network, thereby improving the accuracy that the terminal device determines the cell as a target cell.

The third point to be noted is that the embodiment of the present disclosure is described in examples where the network device sends the first configuration information and the third configuration information respectively. In another embodiment, both the content in the first configuration information and the content in the third configuration information are included in fourth configuration information, the network device sends the fourth configuration information to the terminal device, and the terminal device determines the target cell based on the fourth configuration information. It can also be understood that the fourth configuration information is information obtained by expanding the third configuration information.

The terminal device determines whether the cell belongs to the third-party cell based on the third configuration information included in the fourth configuration information, and then determines whether to determine the cell found through the search as the target cell based on the first configuration information included in the fourth configuration information.

In the embodiment of the present disclosure, the first configuration information and the third configuration information can be obtained through one piece of configuration information, and there is no need for the network device to send the first configuration information and the third configuration information separately, which reduces the resource consumed by sending the configuration information and improves the resource utilization.

In some embodiments, the terminal device determines the cell as the target cell in a case where it determines that the cell found through the search belongs to the third-party network and a first access condition is met.

When the terminal device determines that the cell found through the search belongs to the third-party network, it does not immediately determine the cell as the target cell, but first determines whether the terminal device satisfies the first access condition according to the first configuration information. If it is determined that the first access condition is met, the cell is determined as the target cell, and subsequent cell selection or cell reselection can be performed.

The first access condition includes at least one of the following.

First case: at least one item in the first configuration information broadcast by the cell matches at least one item in second configuration information maintained by the terminal device.

The first configuration information is information used to indicate that the terminal device can access the cell that broadcasts the first configuration information. The second configuration information is used to indicate information of the third-party network that the terminal device accesses.

If the terminal device determines that at least one item in the first configuration information broadcast by the cell matches at least one item in the second configuration information maintained by the terminal device, it determines that the terminal device meets the first access condition, and the terminal device determines the cell as the target cell.

In some embodiments, the terminal device determining that at least one item in the first configuration information broadcast by the cell matches at least one item in the second configuration information maintained by the terminal device includes any of the following.

(1) At least one SNPN network identity in the first configuration information belongs to a SNPN selected by the terminal device, or a SNPN registered with by the terminal device, or a SNPN equivalent to the SNPN registered with by the terminal device.

In the embodiment of the present disclosure, the terminal device selects an SNPN or registers with an SNPN. In addition, if the terminal device registers with a SNPN, the network device will allocate an SNPN equivalent to this SNPN.

(2) At least one group identity in first group identity information included in the first configuration information belongs to a group identity selected by the terminal device, or a group identity equivalent to the group identity selected by the terminal device, or a group identity associated with the PLMN or SNPN registered with by the terminal device, where the first group identity information is information indicating that authentication of the terminal device is allowed to be performed by a third-party network.

The group identity selected by the terminal or the group identity equivalent to the group identity selected by the terminal device or the group identity associated with the PLMN or SNPN registered with by the terminal device are all group identities that allow the authentication of the terminal device to be performed through the third-party network. The first group identity information includes multiple group identities, and each group identity can be understood as a network identity.

Each group identity is used to indicate an identity information group, and the identity information group includes at least one SNPN network identity, or includes at least one PLMN network identity.

(3) At least one group identity in second group identity information included in the first configuration information belongs to a group identity selected by the terminal device, or a group identity equivalent to the group identity selected by the terminal device, or a group identity associated with the PLMN or SNPN registered with by the terminal device, and the second group identity information is information that allows the terminal device to access a cell of a third-party network and obtain subscription information.

The group identity selected by the terminal or the group identity equivalent to the group identity selected by the terminal device or the group identity associated with the PLMN or SNPN registered with by the terminal device are all group identities that allow the terminal device to access the cell of the third-party network and obtain the subscription information. The second group identity information includes multiple group identities, and each group identity can be understood as a network identity.

Each group identity is used to indicate an identity information group, and the identity information group includes at least one SNPN network identity, or includes at least one PLMN network identity.

(4) At least one PLMN network identity in the first configuration information belongs to a PLMN selected by the terminal device, or a PLMN registered with by the terminal device, or a PLMN equivalent to the PLMN registered with by the terminal device.

In the embodiment of the present disclosure, the terminal device selects a PLMN or registers with a PLMN. In addition, if the terminal device registers with a PLMN, the network device will allocate a PLMN equivalent to this PLMN.

In some other embodiments, the first configuration information or the second configuration information includes at least one of the following:

(1) PLMN configuration information. The PLMN configuration information includes configuration information of the PLMN network identity.

(2) SNPN configuration information. The SNPN configuration information includes configuration information of the PLMN network identity.

(3) Access control configuration information. The access control configuration information is a logical identity, which is an identity parallel to the SNPN network identity or the SNPN network identity.

(4) A temporary network identity.

(5) First indication information indicating whether authentication of the terminal device is allowed to be performed through a third-party network.

(6) The first group identity information that allows the authentication of the terminal device to be performed through the third-party network.

The first group identity information includes multiple network identities.

(7) Second indication information indicating whether the terminal device is allowed to initiate a request for authentication by the third-party network when at least one item in the first configuration information broadcast by the cell does not match at least one item in the second configuration information maintained by the terminal device.

(8) Third indication information indicating whether the terminal device is allowed to access a cell of a third-party network and acquire subscription information.

(9) Second group identity information that allows the terminal device to access the cell of the third-party network and obtain the subscription information.

(10) Fourth indication information indicating whether a PLMN, a SNPN, access control configuration information, a CAG or a temporary network identity allows emergency communication.

In some embodiments, granularity of the PLMN configuration information, the SNPN configuration information, the access control configuration information and the temporary network identity in the first configuration information in the embodiment of the present disclosure is cell granularity; and granularity of the first indication information, the first group identity information, the second indication information, the third indication information, the second group identity information, and the fourth indication information is cell granularity, or the granularity of the first indication information, the first group identity information, the second indication information, the third indication information, the second group identity information and the fourth indication information is PLMN granularity, or the granularity of the first indication information, the first group identity information, the second indication information, the third indication information, the second group identity information and the fourth indication information is SNPN granularity, or the granularity of the first indication information, the first group identity information, the second indication information, the third indication information, the second group identity information and the fourth indication information is CAG granularity.

For example, configuration information 1 is used to indicate the PLMN configuration information, the SNPN configuration information, the access control configuration information or the temporary network identity in the first configuration information or the second configuration information.

In a case where the granularity of the PLMN configuration information, the SNPN configuration information, the access control configuration information, the temporary network identity, the first indication information, the first group identity information, the second indication information, the third indication information, the second group identity information and the fourth indication information is the cell granularity, the cell granularity configuration format is as shown in Table 4:

TABLE 4

| Configuration information 1 |
|---|
| First indication information<br>First group identity information<br>Second indication information<br>Third indication information<br>Second group identity information<br>Fourth indication information |

In a case where the granularity of the PLMN configuration information, the SNPN configuration information, the access control configuration information and the temporary network identity is the cell granularity, and the granularity of the first indication information, the first group identity information, the second indication information, the third indication information, the second group identity information and the fourth indication information is the PLMN granularity or SNPN granularity, the cell granularity configuration format is as shown in Table 5:

TABLE 5

| Configuration information 1 | First indication information/second indication information/third indication information/fourth indication information/first group identity information/second group identity information |
|---|---|
| PLMN1 | First indication information<br>Second indication information<br>Third indication information<br>Fourth indication information<br>First group identity information<br>Second group identity information |
| SNPN1 | First indication information<br>Second indication information<br>Third indication information<br>Fourth indication information<br>First group identity information<br>Second group identity information |

In a case where the granularity of the PLMN configuration information, the SNPN configuration information, the access control configuration information and the temporary network identity is the cell granularity, and the granularity of the first indication information, the first group identity information, the second indication information, the third indication information, the second group identity information and the fourth indication information is the CAG granularity, the cell granularity configuration format is as shown in Table 6:

TABLE 6

| Configuration information 1 | CAG information associated with configuration information 1 | First indication information/ second indication information/ third indication information/ fourth indication information/ first group identity information/ second group identity information associated with CAG |
|---|---|---|
| PLMN1 | CAG1 | First indication information<br>Second indication information<br>Third indication information<br>Fourth indication information<br>First group identity information<br>Second group identity information |
| | CAG2 | First indication information<br>Second indication information<br>Third indication information<br>Fourth indication information<br>First group identity information<br>Second group identity information |

In some other embodiments, the granularity of the PLMN configuration information, the SNPN configuration information, the access control configuration information and the temporary network identity in the second configuration information in the embodiment of the present disclosure is terminal granularity; the granularity of the first indication information, the first group identity information, the second indication information, the third indication information, the second group identity information and the fourth indication information is the terminal granularity, or the granularity of the first indication information, the first group identity information, the second indication information, the third indication information, the second group identity information and the fourth indication information is the PLMN granularity, or the granularity of the first indication information, the first group identity information, the second indication information, the third indication information, the second group identity information and the fourth indication information is the SNPN granularity, or the granularity of the first indication information, the first group identity information, the second indication information, the third indication information, the second group identity information and the fourth indication information is the CAG granularity.

The dividing manner of the granularity of the second configuration information is the same as the dividing manner of the granularity of the first configuration information in the foregoing embodiment, which will not be repeated here.

It should be noted that the second configuration information in the embodiment of the present disclosure is maintained by a NAS of the terminal device, or the second configuration information is maintained by an AS of the terminal device.

Second case: a radio frequency signal of the cell satisfies S criterion.

The S criterion refers to that receiving power of the radio frequency signal is greater than preset power and quality of the radio frequency signal is greater than preset quality.

Before the terminal device determines the cell as the target cell, it needs to first determine whether the receiving power of the radio frequency signal of the cell is greater than the preset power and whether the quality of the radio frequency signal is greater than the preset quality. When the terminal device determines that the receiving power of the radio frequency signal of the cell is greater than the preset power and the quality of the radio frequency signal is greater than the preset quality, indicating that the terminal device can perform communication normally in the cell, it determines that the first access condition is met.

Third case: the cell allows access.

After the terminal device finds a cell through scanning, the cell may forbids the terminal device from accessing, then the terminal device needs to first determine whether the cell allows access, and if it is determined that the cell allows access, it determines the cell as the target cell.

Fourth case: the tracking area information associated with the SNPN network identity in the first configuration information does not belong to any of access-forbidden tracking area information associated with the terminal device, the access-forbidden tracking area associated with the terminal device is a tracking area associated with the network identity of the SNPN selected by the terminal device or the SNPN registered with by the terminal device or the SNPN equivalent to the SNPN registered with by the terminal device, and the SNPN in the first configuration information is the SNPN selected by the terminal device or the SNPN registered with by the terminal device or the SNPN equivalent to the SNPN registered with by the terminal device.

Fifth case: the tracking area information associated with the PLMN network identity in the first configuration information does not belong to any of the access-forbidden tracking area information associated with the terminal device, the access-forbidden tracking area associated with the terminal device is the tracking area associated with the network identity of the PLMN selected by the terminal device or the PLMN registered with by the terminal device or the PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

It should be noted that this embodiment of the present disclosure is described only in an example where the cell found through the search is determined as the target cell according to the first configuration information and the third configuration information. In another embodiment, after the terminal device find the cell through the search, if it determines that the cell belongs to a third-party network, it directly determines the cell as the target cell, and will not perform determining the cell as the target cell according to the first configuration information.

According to the method of determining the target cell provided in the embodiments of the present disclosure, when the terminal device determines the cell found through search belongs to the third-party network, it can determine the cell belonging to the third-party network as a cell for cell selection or cell reselection, which expands the deployment types of communication networks, breaks the limitations that terminal device can only perform communication based on the subscribed party's network, expands the manner in which the terminal device performs communication based on the communication network, thereby improving the communication quality of the terminal device.

Figure 4:
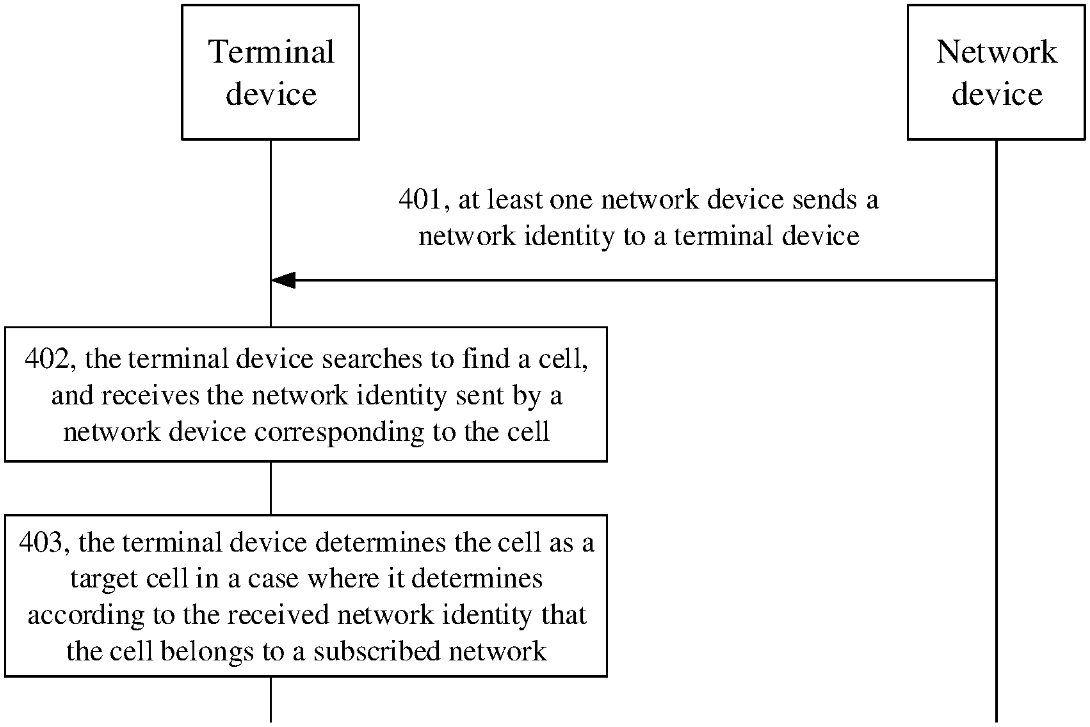
FIG. 4 shows a flowchart of a cell determining method provided in an exemplary embodiment of the present disclosure.

The above embodiment in FIG. 3 illustrates that when the cell found through searching belongs to a third-party network, the terminal device determines the cell as the target cell, and the embodiment in FIG. 4 illustrates the steps performed by the terminal device in the case where the cell found through searching belongs to the subscribed network. Referring to FIG. 4, the method includes the following.

In 401, at least one network device sends a network identity to a terminal device.

In 402, the terminal device performs searching to find a cell, and receives the network identity sent by a network device corresponding to the cell.

In 403, the terminal device determines the cell as a target cell in a case where it determines according to the received network identity that the cell belongs to a subscribed network.

The terminal device can identify that the cell belongs to the subscribed network according to the received network identity sent by the network device corresponding to the cell, and the terminal device determines the cell as the target cell in the case where it determines that the cell found through searching belongs to the subscribed network.

The network identity is used to identify a network type corresponding to the network, for example, the network identity includes a PLMN network identity, an SNPN network identity or other network identities. The PLMN network identity is used to identify that the network belongs to a PLMN network. The SNPN network identity is used to identify that the network belongs to a PLMN network.

In the embodiment of the present disclosure, the terminal device stores the subscribed network identity, and the cell also broadcasts the network identity, so the terminal device can determine whether the cell belongs to the subscribed network according to the network identity broadcast by the cell. That the terminal device determines that the cell found through searching belongs to the subscribed network includes any of the following:

(1) At least one PLMN network identity broadcast by the cell belongs to a PLMN selected by the terminal device, or a PLMN registered with by the terminal device, or a PLMN equivalent to the PLMN registered with by the terminal device, and the at least one PLMN network identity is not associated with any CAG network identity and is not associated with any CAG-only indication information, or the CAG-only indication information associated with at least one PLMN network identity is a second identity. The second identity is "false" or other identities.

(2) At least one PLMN network identity broadcast by the cell belongs to the PLMN selected by the terminal device, or the PLMN registered with by the terminal device, or the PLMN equivalent to the PLMN registered with by the terminal device, and at least one CAG network identity associated with the PLMN network identity of the terminal device is included in a CAG network identity list associated with the same PLMN network identity broadcast by the cell as that of the terminal device. For example, the above cases (1) and (2) are as shown in Table 7:

TABLE 7

| PLMN network identity broadcast by the cell and CAG information associated with the PLMN network identity | | PLMN selected or registered with by the terminal or PLMN equivalent to PLMN registered with by the terminal and CAG-only indication information associated with corresponding PLMN | |
|---|---|---|---|
| PLMN ID 1 | No associated CAG information | PLMN ID 1 | No CAG-only indication information |
| PLMN ID 2 | No associated CAG information | PLMN ID 2 | CAG-only indication is of value 'false' |
| PLMN ID 3 | CAG1<br>CAG2<br>CAG3 | PLMN ID 3 | CAG1<br>CAG4<br>CAG5 |

(3) At least one SNPN network identity broadcast by the cell belongs to a SNPN selected by the terminal device, or a SNPN registered with by the terminal device, or a SNPN equivalent to the SNPN registered with by the terminal device. For example, the case (3) is as shown in Table 8:

TABLE 8

| SNPN network identity broadcast by the cell | SNPN selected or registered with by the terminal or SNPN equivalent to the SNPN registered with by the terminal |
|---|---|
| SNPN ID 1 | SNPN ID 1 |
| SNPN ID 2 | SNPN ID 3 |
| SNPN ID 3 | SNPN ID 5 |

In some embodiment, the terminal device determines the cell found through the search as the target cell in a case where it determines that the cell belongs to the subscribed network and a second access condition is met.

The second access condition includes at least one of the following:

First case: at least one PLMN network identity broadcast by the cell belongs to a PLMN selected by the terminal device, or a PLMN registered with by the terminal device, or a PLMN equivalent to the PLMN registered with by the terminal device, and the at least one PLMN network identity is not associated with any CAG network identity information and is not associated with any CAG-only indication information, or the CAG-only indication information associated with the at least one PLMN network identity is the second identity.

Second case: at least one PLMN network identity broadcast by the cell belongs to the PLMN selected by the terminal device, or the PLMN registered with by the terminal device, or the PLMN equivalent to the PLMN registered with by the terminal device, and the at least one CAG network identity associated with the PLMN network identity of the terminal device is included in a CAG network identity list associated with the same PLMN network identity broadcast by the cell as that of the terminal device.

Third case: at least one SNPN network identity broadcast by the cell belongs to a SNPN selected by the terminal device, or a SNPN registered with by the terminal device, or a SNPN equivalent to the SNPN registered with by the terminal device.

Fourth case: a radio frequency signal of the cell satisfies S criterion, where the S criterion is that receiving power of the radio frequency signal is greater than preset power and quality of the radio frequency signal is greater than preset quality.

Fifth case: the cell allows access.

Sixth case: tracking area information associated with the SNPN network identity broadcast by the cell does not belong to any of the access-forbidden tracking area information associated with the terminal device, and the access-forbidden tracking area associated with the terminal device is the tracking area associated the network identity of the SNPN selected by the terminal device or the SNPN registered with by the terminal device or the SNPN equivalent to the SNPN registered with by the terminal device, and the SNPN broadcast by the cell is the SNPN selected by the terminal device or the SNPN registered with by the terminal device or the SNPN equivalent to the SNPN registered with by the terminal device.

Seventh case: tracking area information associated with the PLMN network identity broadcast by the cell does not belong to any of the access-forbidden tracking area information associated with the terminal device, and the access-forbidden tracking area associated with the terminal device is the tracking area associated the network identity of the PLMN selected by the terminal device or the PLMN registered with by the terminal device or the PLMN equivalent to the PLMN registered with by the terminal device, and the PLMN broadcast by the cell is the PLMN selected by the terminal device or the PLMN registered with by the terminal device or the PLMN equivalent to the PLMN registered with by the terminal device.

It should be noted that the embodiment of the present disclosure is only described in the example where the terminal device determines that the cell belongs to the subscribed network according to the received network identity. In another embodiment, the terminal device receives the third configuration information sent by the network device corresponding to the cell, and determines whether the cell belongs to the subscribed network according to the network identity included in the third configuration information.

According to the method provided in the embodiment of the present disclosure, when the terminal device determines that the cell found through searching belongs to the subscribed network, it can determine the cell belonging to the subscribed network as the cell used for cell selection or cell reselection, so as to ensure that the terminal device accesses the cell for communication, thereby improving the communication effect of the terminal device.

Figure 5:
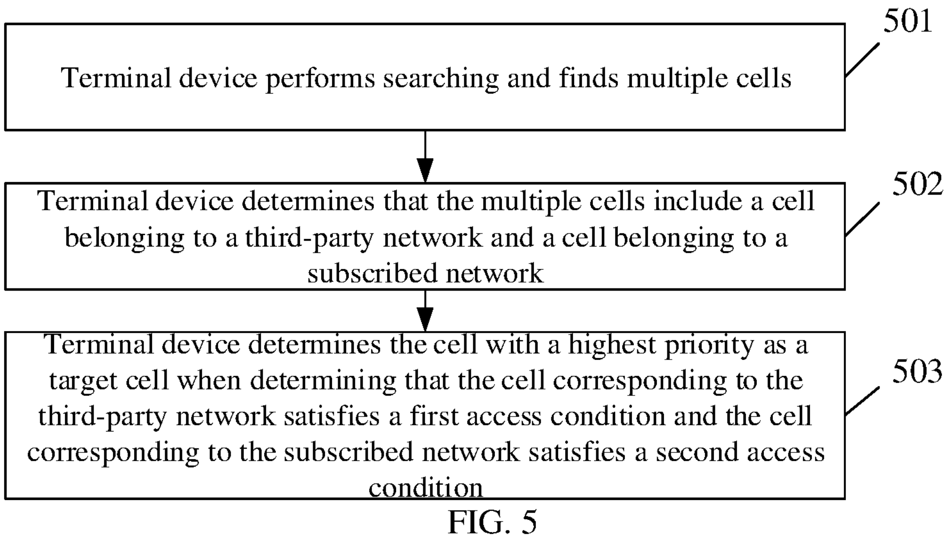
FIG. 5 shows a flowchart of a cell determining method provided in an exemplary embodiment of the present disclosure.

In some other embodiments, the embodiments in FIG. 3 and FIG. 4 illustrate that the cell belongs to a third-party network and a subscribed network, respectively. If there are multiple cells found through the searching, and the multiple cells include cells belonging to the third-party network and the subscribed network, reference can be made to FIG. 5 for the method of determining the target cell. The method includes the following.

In 501, the terminal device performs searching and finds multiple cells.

In 502, the terminal device determines that the multiple cells include a cell belonging to a third-party network and a cell belonging to a subscribed network.

The steps 501 and 502 are similar to the process of determining that the cell belongs to the third-party network and the subscribed network in the above-mentioned steps 304 and 403, which will not be repeated here.

In 503, the terminal device determines the cell with a highest priority as a target cell in a case where it determines that the cell corresponding to the third-party network satisfies a first access condition and the cell corresponding to the subscribed network satisfies a second access condition.

The process of determining that the cell satisfies the first access condition and determining that the cell satisfies the second access condition in step 504 is similar to the process of determining that the cell satisfies the first access condition and the second access condition in step 304 and step 403 above, which will not be repeated here.

In the embodiment of the present disclosure, after the terminal device determines that the cells satisfy the first access condition and the second access condition, each cell having a priority, the terminal device determines the cell with the highest priority as the target cell.

For example, the priority of the cell belonging to the third-party network is higher than the priority of the cell belonging to the subscribed network, or the priority of the cell belonging to the subscribed network is higher than the priority of the cell belonging to the third-party network.

The terminal device determines the cell with the highest priority among the cells meeting the conditions as the target cell, which can ensure that the terminal device accesses the cell with the highest priority, and guarantees the communication quality of communication based on the cell.

In some embodiments, the priority of the cell is configured by a Non Access Stratum (NAS) or an Access Stratum (AS).

The network device indicates the priority of the cell by configuring bits for the cell or the terminal device. Alternatively, the priority of the cell or the terminal device is pre-configured by the protocol.

It should be noted that step 503 in the embodiment of the present disclosure is an optional step, and in another embodiment, step 503 can also be replaced by step 504.

In 504, in a case where it is determined that the cell corresponding to the third-party network satisfies the first access condition and the cell corresponding to the subscribed network satisfies the second access condition, in response to a selection operation, a selected cell is determined as the target cell.

In the embodiment of the present disclosure, after the terminal device determines the cells that meet the first access condition and the second access condition, it displays the multiple cells that meet the conditions, and the user triggers a selection operation of selecting from among the multiple cells via the terminal device, and according to the detected selection operation, the terminal device determines the selected cell as the target cell.

The selection operation is a click operation, a long press operation or other operations.

After the terminal device determines multiple cells that meet the first access condition and the second access condition, the user selects the target cell, which not only ensures the personalization of the terminal device's communication based on the cell, but also ensures that the determined target cell meets the communication requirements, improving the communication quality.

In the method provided by the embodiment of the present disclosure, in the case where the terminal device finds multiple cells through searching, the target cell is selected from the cells satisfying the first access condition and the second access condition, and the target cell meets the communication requirements for performing communication, which can improve the communication quality of the terminal device based on the target cell, and ensure the communication effect.

Figure 6:
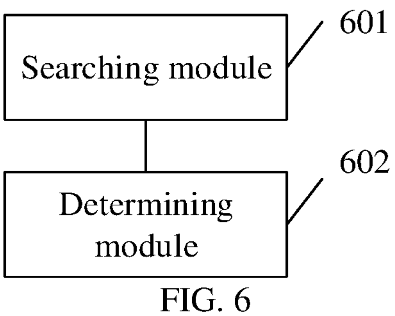
FIG. 6 shows a block diagram of a cell determining apparatus provided in an exemplary embodiment of the present disclosure.
Figure 8:
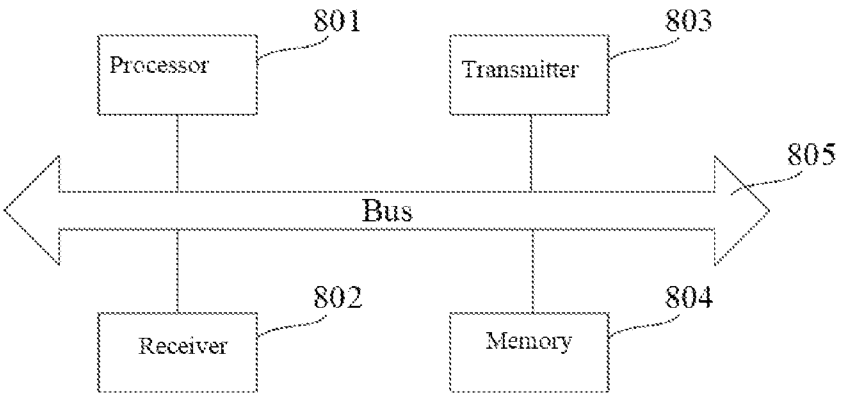
FIG. 8 shows a schematic structural diagram of a communication device provided by an exemplary embodiment of the present disclosure.

FIG. 6 shows a block diagram of a cell determining apparatus provided by an exemplary embodiment of the present disclosure, which is applied to a terminal device. Referring to FIG. 8, the apparatus includes the following:

- a search module 601, configured to perform searching to find a cell;
- a determining module 602, configured to determine the cell as a target cell in a case where it is determined that the cell belongs to a third-party network;
- wherein the third-party network is a network other than a subscribed network of the terminal device, and the target cell is used for the terminal device to perform cell selection or cell reselection.

In some embodiments, the determining module 602 is configured to determine the cell as the target cell when it is determined that the cell belongs to the third-party network and satisfies a first access condition.

In some embodiments, the determining module 602 is configured to determine the cell as the target cell when it is determined that the cell found through searching belongs to the subscribed network.

In some embodiments, the determining module 602 is configured to determine the cell as the target cell when it is determined that the cell found through searching belongs to the subscribed network and satisfies a second access condition.

In some embodiments, the cell found through searching includes multiple cells, and the network types to which the multiple cells belong include the third-party network and the subscribed network; the determining module is configured to: determine the cell with a highest priority as the target cell in a case where it is determined that the cell corresponding to the third-party network satisfies the first access condition and the cell corresponding to the subscribed network satisfies the second access condition; or determine a selected cell as the target cell in response to a selection operation when it is determined that the cell corresponding to the third-party network satisfies the first access condition, and the cell corresponding to the subscribed network satisfies the second access condition.

In some embodiments, the first access condition includes at least one of the following:

at least one item in first configuration information broadcast by the cell matches at least one item in second configuration information maintained by the terminal device; or a radio frequency signal of the cell satisfies S criterion, where the S criterion is that receiving power of the radio frequency signal is greater than preset power and quality of the radio frequency signal is greater than preset quality; or the cell allows access; or tracking area information associated with a SNPN network identity in the first configuration information does not belong to any access-forbidden tracking area information associated with the terminal device, a access-forbidden tracking area associated with the terminal device being a tracking area associated with a network identity of a SNPN selected by the terminal device, or a SNPN registered with by the terminal device, or a SNPN equivalent to the SNPN registered with by the terminal device, and the SNPN in the first configuration information being the SNPN selected by the terminal device, or the SNPN registered with by the terminal device, or the SNPN equivalent to the SNPN registered with by the terminal device; or tracking area information associated with a PLMN network identity in the first configuration information does not belong to any access-forbidden tracking area information associated with the terminal device, the access-forbidden tracking area associated with the terminal device being a tracking area associated with a network identity of a PLMN selected by the terminal device, or a PLMN registered with by the terminal device, or a PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

In some embodiments, that at least one item in the first configuration information broadcast by the cell matches at least one item in the second configuration information maintained by the terminal device includes: at least one SNPN network identity in the first configuration information belongs to the SNPN selected by the terminal device, the SNPN registered with by the terminal device, or the SNPN equivalent to the SNPN registered with by the terminal device; or at least one group identity in first group identity information included in the first configuration information belongs to a group identity selected by the terminal device or a group identity equivalent to the group identity selected by the terminal device or a group identity associated with the PLMN or SNPN registered with by the terminal device, the first group identity information being information indicating that authentication of the terminal device is allowed to be performed through a third-party network; or at least one group identity in second group identity information included in the first configuration information belongs to the group identity selected by the terminal device or the group identity equivalent to the group identity selected by the terminal device, or the group identity associated with the PLMN or SNPN registered with by the terminal device, the second group identity information is the information indicating that the terminal device is allowed to access the cell of the third-party network and obtain subscription information; or at least one PLMN network identity in the first configuration information belongs to the PLMN selected by the terminal device or the PLMN registered with by the terminal device or the PLMN equivalent to the PLMN registered with by the terminal device.

In some embodiments, the first configuration information or the second configuration information includes at least one of the following:

PLMN configuration information; or SNPN configuration information; or access control configuration information; or a temporary network identity; or first indication information indicating whether authentication of the terminal device is allowed to be performed through a third-party network; a first group identity information that allows the authentication of the terminal device to be performed through the third-party network, the first group identity information including multiple network identities; or second indication information indicating whether to allow the terminal device to initiate a request for authentication by the third-party network in a case where at least one item in the first configuration information broadcast by the cell does not match at least one item in the second configuration information maintained by the terminal device; or third indication information indicating whether the terminal device is allowed to access the cell of the third-party network and obtain subscription information; or second group identity information that allows the terminal device to access the cell of the third-party network and obtain the subscription information, where the second group identity information includes multiple network identities; or fourth indication information indicating whether the PLMN, the SNPN, the access control configuration information, the CAG or the temporary network identity allows emergency communication.

In some embodiments, granularity of the PLMN configuration information, the SNPN configuration information, the access control configuration information and the temporary network identity in the first configuration information is cell granularity;

the granularity of the first indication information, the first group identity information, the second indication information, the third indication information, the second group identity information, and the fourth indication information is cell granularity, or the granularity of the first indication information, the first group identity information, the second indication information, the third indication information, the second group identity information and the fourth indication information is PLMN granularity, or the granularity of the first indication information, the first group identity information, the second indication information, the third indication information, the second group identity information, and the fourth indication information is SNPN granularity, or the granularity of the first indication information, the first group identity information, the second indication information, the third indication information, the second group identity information and the fourth indication information is CAG granularity.

In some embodiments, the granularity of the PLMN configuration information, the SNPN configuration information, the access control configuration information and the temporary network identity in the second configuration information is terminal granularity;

the granularity of the first indication information, the first group identity information, the second indication information, the third indication information, the second group identity information, and the fourth indication information is the terminal granularity, or the granularity of the first indication information, the first group identity information, the second indication information, the third indication information, the second group identity information and the fourth indication information is the PLMN granularity, or the granularity of the first indication information, the first group identity information, the second indication information, the third indication information, the second group identity information, and the fourth indication information is the SNPN granularity, or the granularity of the first indication information, the first group identity information, the second indication information, the third indication information, the second group identity information and the fourth indication information is the CAG granularity.

In some embodiments, the second configuration information is maintained by a NAS of the terminal device, or the second configuration information is maintained by an AS of the terminal device.

In some embodiments, the second access condition includes at least one of the following:

at least one PLMN network identity broadcast by the cell belongs to a PLMN selected by the terminal device, or a PLMN registered with by the terminal device, or a PLMN equivalent to the PLMN registered with by the terminal device, and the at least one PLMN network identity is not associated with any CAG network identity information and is not associated with any CAG-only indication information, or the CAG-only indication information associated with the at least one PLMN network identity is a second identity;

or at least one PLMN network identity broadcast by the cell belongs to the PLMN selected by the terminal device, or the PLMN registered with by the terminal device, or the PLMN equivalent to the PLMN registered with by the terminal device, and the at least one CAG network identity associated with the PLMN network identity of the terminal device is included in a CAG network identity list associated with the same PLMN network identity broadcast by the cell as that of the terminal device;

or at least one SNPN network identity broadcast by the cell belongs to the SNPN selected by the terminal device, or the SNPN registered with by the terminal device, or the SNPN equivalent to the SNPN registered with by the terminal device;

or a radio frequency signal of the cell satisfies S criterion, where the S criterion is that receiving power of the radio frequency signal is greater than preset power and quality of the radio frequency signal is greater than preset quality;

or the cell allows access; or tracking area information associated with the SNPN network identity broadcast by the cell does not belong to any of the access-forbidden tracking area information associated with the terminal device, where the access-forbidden tracking area associated with the terminal device is the tracking area associated the network identity of the SNPN selected by the terminal device or the SNPN registered with by the terminal device or the SNPN equivalent to the SNPN registered with by the terminal device, and the SNPN broadcast by the cell is the SNPN selected by the terminal device or the SNPN registered with by the terminal device or the SNPN equivalent to the SNPN registered with by the terminal device;

or tracking area information associated with the PLMN network identity broadcast by the cell does not belong to any of the access-forbidden tracking area information associated with the terminal device, where the access-forbidden tracking area associated with the terminal device is the tracking area associated with the network identity of the PLMN selected by the terminal device or the PLMN registered with by the terminal device or the PLMN equivalent to the PLMN registered with by the terminal device, and the PLMN broadcast by the cell is the PLMN selected by the terminal device or the PLMN registered with by the terminal device or the PLMN equivalent to the PLMN registered with by the terminal device.

In some embodiments, determining that the network type to which the cell found through searching belongs is a third-party network includes any of the following:

any of the network identities included in third configuration information broadcast by the cell does not match any of the subscribed network identities maintained by the terminal device; or, at least one network identity included in the third configuration information broadcast by the cell matches at least one subscribed network identity maintained by the terminal device, but a tracking area corresponding to a tracking area identity associated with the matching network identity is forbidden from being accessed; or, at least one PLMN network identity included in the third configuration information broadcast by the cell matches at least one PLMN network identity maintained by the terminal device, but CAG information associated with the matching PLMN network identities does not match with each other.

In some embodiments, the third configuration information includes a PLMN network identity and/or an SNPN network identity.

In some embodiments, that the CAG information associated with the matching PLMN network identities does not match with each other includes any of the following cases:

a CAG network identity associated with the PLMN network identity subscribed by the terminal device does not match a CAG network identity associated with the PLMN network identity in the third configuration information; or the PLMN network identity subscribed by the terminal device is not associated with any CAG network identity, and the PLMN network identity in the third configuration information is associated with a CAG network identity; or a CAG-only indication bit associated with the PLMN network identity subscribed by the terminal device is a first identity, and the PLMN network identity in the third configuration information is not associated with any CAG network identity.

In some embodiments, the subscribed network identity is maintained by a NAS of the terminal device, or the subscribed network identity is maintained by an AS of the terminal device.

In some embodiments, the subscribed network identity is configured by the network device, or obtained by the terminal device through NAS signaling, or configured by a factory pre-configuration process.

In some embodiments, determining that the network type of the cell found through searching belongs to a subscribed network includes any of the following:

at least one PLMN network identity broadcast by the cell belongs to a PLMN selected by the terminal device, or a PLMN registered with by the terminal device, or a PLMN equivalent to the PLMN registered by the terminal device, and the at least one PLMN network identity is not associated with any CAG network identity and is not associated with any CAG-only indication information, or the CAG-only indication information associated with the at least one PLMN network identity is a second identity;

or at least one PLMN network identity broadcast by the cell belongs to the PLMN selected by the terminal device, or the PLMN registered with by the terminal device, or the PLMN equivalent to the PLMN registered with by the terminal device, and the at least one CAG network identity associated with the PLMN network identity of the terminal device is included in a CAG network identity list associated with the same PLMN network identity broadcast by the cell as that of the terminal device;

or at least one SNPN network identity broadcast by the cell belongs to a SNPN selected by the terminal device, or a SNPN registered with by the terminal device, or a SNPN equivalent to the SNPN registered with by the terminal device.

Figure 7:
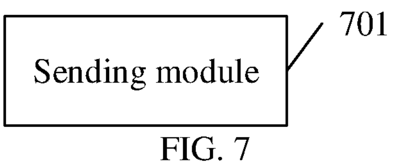
FIG. 7 shows a block diagram of an apparatus for sending target information provided by an exemplary embodiment of the present disclosure.

FIG. 7 shows a block diagram of a cell determining apparatus provided by an exemplary embodiment of the present disclosure, which is applied to a network device. Referring to FIG. 8, the apparatus includes:

a sending module 701, configured to send first configuration information and/or third configuration information to a terminal device;

wherein the first configuration information includes configuration information corresponding to a third-party network, or includes configuration information corresponding to a subscribed network and the configuration information corresponding to the third-party network, and the third configuration information includes the configuration information corresponding to the subscribed network.

In some embodiments, the first configuration information includes at least one of the following:

PLMN configuration information; or, SNPN configuration information; or, access control configuration information; or, a temporary network identity; or, first indication information indicating whether authentication of the terminal device is allowed to be performed through a third-party network; a first group identity information that allows the authentication of the terminal device to be performed through the third-party network, the group identity information including multiple network identities; or second indication information indicating whether the terminal device is allowed to initiate a request for authentication by the third-party network in a case where at least one item in first configuration information broadcast by the cell does not match at least one item in second configuration information maintained by the terminal device; or third indication information indicating whether the terminal device is allowed to access the cell of the third-party network and obtain subscription information; or second group identity information that allows the terminal device to access the cell of the third-party network and obtain the subscription information; or fourth indication information indicating whether the PLMN, the SNPN, the access control configuration information, the CAG or the temporary network identity allows emergency communication.

In some embodiments, the granularity of the PLMN configuration information, the SNPN configuration information, the access control configuration information and the temporary network identity in the first configuration information is cell granularity;

the granularity of the first indication information, the first group identity information, the second indication information, the third indication information, the second group identity information, and the fourth indication information is the cell granularity, or the granularity of the first indication information, the first group identity information, the second indication information, the third indication information, the second group identity information and the fourth indication information is PLMN granularity, or the granularity of the first indication information, the first group identity information, the second indication information, the third indication information, the second group identity information, and the fourth indication information is SNPN granularity, or the granularity of the first indication information, the first group identity information, the second indication information, the third indication information, the second group identity information and the fourth indication information is CAG granularity.

In some embodiments, the third configuration information includes a PLMN network identity and/or an SNPN network identity.

FIG. 8 shows a schematic structural diagram of a communication device provided by an exemplary embodiment of the present disclosure, and the communication device includes: a processor 801, a receiver 802, a transmitter 803, a memory 804 and a bus 805.

The processor 801 includes one or more processing cores, and the processor 801 executes various functional applications and information processing by running software programs and modules. The receiver 802 and the transmitter 803 can be realized as a communication component, and the communication component can be a communication chip. The memory 804 is connected to the processor 801 through the bus 805.

The memory 804 may be configured to store at least one program code, and the processor 801 is configured to execute the at least one program code, so as to implement various steps in the foregoing method embodiments.

In addition, the communication device can be a terminal device or a network device. The memory 804 can be implemented by any type of volatile or non-volatile storage device or a combination thereof. The volatile or non-volatile storage device includes, but is not limited to: a magnetic disk or optical disk, an electrically erasable and programmable Read-only memory (EEPROM), an erasable and programmable read-only memory (EPROM), a static random access memory (SRAM), a read-only memory (ROM), a magnetic memory, a flash memory and a programmable read-only memory (PROM).

In an exemplary embodiment, there is also provided a computer-readable storage medium having stored thereon executable program codes, and the executable program codes are loaded and executed by the processor to implement the cell determining method or target information sending method performed by the communication device provided in the above method embodiments.

In an exemplary embodiment, a chip is also provided, the chip includes a programmable logic circuit and/or program instructions, and the chip, when running on a terminal device or a network device, is configured to implement the above cell determining method or target information sending method.

In an exemplary embodiment, a computer program product is also provided, which is used to implement the above cell determining method or target information sending method when the computer program product is executed by a processor of a terminal device or a network device.

The technical solutions provided by the embodiments of the present disclosure include at least the following beneficial effects.

According to the method, apparatus, device and storage medium provided in the embodiments of the present disclosure, when the terminal device determines the cell found through searching belongs to the third-party network, it can determine the cell belonging to the third-party network as a cell used for cell selection or cell reselection, which expands the deployment types of communication networks, breaks the limitations that terminal device can only perform communication based on the subscribed party's network, expands the manner in which the terminal device performs communication based on the communication network, thereby improving the communication quality of the terminal device.

Those of ordinary skill in the art can understand that all or part of the steps in the foregoing embodiments can be implemented by hardware, or by a program instructing relevant hardware. The program can be stored in a computer-readable storage medium. The storage medium mentioned above can be a read-only memory, a magnetic disk, an optical disk, or the like.

Those described above are only preferred embodiments of the present disclosure, and are not intended to limit the present disclosure. Any modification, equivalent replacement, improvement or the like made within the spirit and principle of the present disclosure shall fall within the protection scope of the present disclosure.

What is claimed is:

1. A cell determining method, being applied to a terminal device, and the method comprising:

performing searching to find a cell; and determining the cell as a target cell in a case where it is determined that the cell belongs to a third-party network;

wherein the third-party network is a network other than a subscribed network of the terminal device, and the target cell is used for the terminal device to perform cell selection or cell reselection, wherein the determining the cell as the target cell in the case where it is determined that the cell belongs to the third-party network comprises:

determining the cell as the target cell in the case where it is determined that the cell belongs to the third-party network and satisfies a first access condition, wherein the first access condition comprises:

at least one Stand-alone Non-public Network (SNPN) identity in first configuration information belongs to a SNPN selected by the terminal device, or a SNPN registered with by the terminal device, or a SNPN equivalent to the SNPN registered with by the terminal device; and tracking area information associated with the SNPN identity in the first configuration information does not belong to any of access-forbidden tracking area information associated with the terminal device, wherein the access-forbidden tracking area associated with the terminal device is a tracking area associated with the identity of the SNPN selected by the terminal device or the SNPN registered with by the terminal device or the SNPN equivalent to the SNPN registered with by the terminal device.

2. The method according to claim 1, wherein the first configuration information further comprises at least one of the following:

Public Land Mobile Network (PLMN) configuration information;

access control configuration information;

a temporary network identity;

first indication information indicating whether authentication of the terminal device is allowed to be performed through a third-party network;

first group identity information that allows the authentication of the terminal device to be performed through the third-party network, wherein the first group identity information comprises multiple network identities;

third indication information indicating whether the terminal device is allowed to access a cell of a third-party network and obtain subscription information;

second group identity information that allows the terminal device to access the cell of the third-party network and obtain the subscription information, wherein the second group identity information comprises multiple network identities; or fourth indication information indicating whether a PLMN, a SNPN, the access control configuration information, a Closed Access Group (CAG) or the temporary network identity allows emergency communication.

3. The method according to claim 2, wherein granularity of the PLMN configuration information, the SNPN configuration information, the access control configuration information and the temporary network identity in the first configuration information is cell granularity;

granularity of the first indication information, the first group identity information, the third indication information, the second group identity information, and the fourth indication information is cell granularity, or the granularity of the first indication information, the first group identity information, the third indication information, the second group identity information, and the fourth indication information is PLMN granularity, or the granularity of the first indication information, the first group identity information, the third indication information, the second group identity information and the fourth indication information is SNPN granularity, or the granularity of the first indication information, the first group identity information, the third indication information, the second group identity information, and the fourth indication information is CAG granularity.

4. The method according to claim 1, wherein the first access condition further comprises at least one of the following:

a radio frequency signal of the cell satisfies S criterion, wherein the S criterion is that receiving power of the radio frequency signal is greater than preset power and quality of the radio frequency signal is greater than preset quality;

the cell allows access; or tracking area information associated with a PLMN network identity in the first configuration information does not belong to any of access-forbidden tracking area information associated with the terminal device, wherein the access-forbidden tracking area associated with the terminal device is a tracking area associated with a network identity of a PLMN selected by the terminal device or a PLMN registered with by the terminal device or a PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

5. The method according to claim 1, wherein that the cell found through searching belongs to the third-party network comprises:

any network identity included in the first configuration information broadcast by the cell does not match any subscribed network identity maintained by the terminal device.

6. A terminal device, comprising:

a processor; and a memory for storing program codes executable by the processor;

wherein the processor is configured to load and execute the program codes to cause the terminal device to:

perform searching to find a cell; and determine the cell as a target cell in a case where it is determined that the cell belongs to a third-party network;

wherein the third-party network is a network other than a subscribed network of the terminal device, and the target cell is used for the terminal device to perform cell selection or cell reselection, wherein the determining the cell as the target cell in the case where it is determined that the cell belongs to the third-party network comprises:

determining the cell as the target cell in the case where it is determined that the cell belongs to the third-party network and satisfies a first access condition, wherein the first access condition comprises:

at least one Stand-alone Non-public Network (SNPN) identity in first configuration information belongs to a SNPN selected by the terminal device, or a SNPN registered with by the terminal device, or a SNPN equivalent to the SNPN registered with by the terminal device; and tracking area information associated with the SNPN identity in the first configuration information does not belong to any of access-forbidden tracking area information associated with the terminal device, wherein the access-forbidden tracking area associated with the terminal device is a tracking area associated with the identity of the SNPN selected by the terminal device or the SNPN registered with by the terminal device or the SNPN equivalent to the SNPN registered with by the terminal device.

7. The terminal device according to claim 6, wherein the first configuration information further comprises at least one of the following:

Public Land Mobile Network (PLMN) configuration information;

access control configuration information;

a temporary network identity;

first indication information indicating whether authentication of the terminal device is allowed to be performed through a third-party network;

first group identity information that allows the authentication of the terminal device to be performed through the third-party network, wherein the first group identity information comprises multiple network identities;

third indication information indicating whether the terminal device is allowed to access a cell of a third-party network and obtain subscription information;

second group identity information that allows the terminal device to access the cell of the third-party network and obtain the subscription information, wherein the second group identity information comprises multiple network identities; or fourth indication information indicating whether a PLMN, a SNPN, access control configuration information, a Closed Access Group (CAG) or a temporary network identity allows emergency communication.

8. The terminal device according to claim 7, wherein granularity of the PLMN configuration information, the SNPN configuration information, the access control configuration information and the temporary network identity in the first configuration information is cell granularity; and granularity of the first indication information, the first group identity information, the third indication information, the second group identity information, and the fourth indication information is the cell granularity, or the granularity of the first indication information, the first group identity information, the third indication information, the second group identity information, and the fourth indication information is PLMN granularity, or the granularity of the first indication information, the first group identity information, the third indication information, the second group identity information and the fourth indication information is SNPN granularity, or the granularity of the first indication information, the first group identity information, the third indication information, the second group identity information, and the fourth indication information is CAG granularity.

9. The terminal device according to claim 6, wherein the first access condition further comprises at least one of the following:

a radio frequency signal of the cell satisfies S criterion, wherein the S criterion is that receiving power of the radio frequency signal is greater than preset power and quality of the radio frequency signal is greater than preset quality;

the cell allows access; or tracking area information associated with a PLMN network identity in the first configuration information does not belong to any of access-forbidden tracking area information associated with the terminal device, wherein the access-forbidden tracking area associated with the terminal device is a tracking area associated with a network identity of a PLMN selected by the terminal device or a PLMN registered with by the terminal device or a PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

10. The terminal device according to claim 6, wherein that the cell found through searching belongs to the third-party network comprises:

any network identity included in the first configuration information broadcast by the cell does not match any subscribed network identity maintained by the terminal device.

11. A cell determining method, being applied to a network device, the method comprising:

sending first configuration information to a terminal device;

wherein the first configuration information is used for the terminal device for determining a cell found through searching as a target cell in a case where it is determined that the cell found through searching belongs to a third-party network and satisfies a first access condition, the third-party network is a network other than a subscribed network of the terminal device, and the first access condition comprises:

at least one Stand-alone Non-public Network (SNPN) identity in the first configuration information belongs to a SNPN selected by the terminal device, or a SNPN registered with by the terminal device, or a SNPN equivalent to the SNPN registered with by the terminal device; and tracking area information associated with the SNPN identity in the first configuration information does not belong to any of access-forbidden tracking area information associated with the terminal device, wherein the access-forbidden tracking area associated with the terminal device is a tracking area associated with the identity of the SNPN selected by the terminal device or the SNPN registered with by the terminal device or the SNPN equivalent to the SNPN registered with by the terminal device.

12. The method according to claim 11, wherein the first configuration information further comprises at least one of the following:

first indication information indicating whether authentication of the terminal device is allowed to be performed through a third-party network;

first group identity information that allows the authentication of the terminal device to be performed through the third-party network, wherein the group identity information comprises multiple network identities;

third indication information indicating whether the terminal device is allowed to access a cell of a third-party network and obtain subscription information; or second group identity information that allows the terminal device to access the cell of the third-party network and obtain the subscription information, and wherein the granularity of the first indication information, the first group identity information, the third indication information, and the second group identity information is SNPN granularity.

13. The method according to claim 12, wherein granularity of the PLMN configuration information, the SNPN configuration information, the access control configuration information and the temporary network identity in the first configuration information is cell granularity;

granularity of the first indication information, the first group identity information, the third indication information, the second group identity information, and the fourth indication information is cell granularity, or the granularity of the first indication information, the first group identity information, the third indication information, the second group identity information, and the fourth indication information is PLMN granularity, or the granularity of the first indication information, the first group identity information, the third indication information, the second group identity information and the fourth indication information is SNPN granularity, or the granularity of the first indication information, the first group identity information, the third indication information, the second group identity information, and the fourth indication information is CAG granularity.

14. The method according to claim 11, wherein the first access condition further comprises at least one of the following:

a radio frequency signal of the cell satisfies S criterion, wherein the S criterion is that receiving power of the radio frequency signal is greater than preset power and quality of the radio frequency signal is greater than preset quality;

the cell allows access; or tracking area information associated with a PLMN network identity in the first configuration information does not belong to any of access-forbidden tracking area information associated with the terminal device, wherein the access-forbidden tracking area associated with the terminal device is a tracking area associated with a network identity of a PLMN selected by the terminal device or a PLMN registered with by the terminal device or a PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

15. The method according to claim 11, wherein that the cell found through searching belongs to the third-party network comprises:

any network identity included in the first configuration information broadcast by the cell does not match any subscribed network identity maintained by the terminal device.

16. A network device, comprising:

a processor; and a memory for storing program codes executable by the processor;

wherein the processor is configured to load and execute the program codes to cause the network device to:

send first configuration information to a terminal device, wherein the first configuration information is used for the terminal device for determining a cell found through searching as a target cell in a case where it is determined that the cell found through searching belongs to a third-party network and satisfies a first access condition, the third-party network is a network other than a subscribed network of the terminal device, and the first access condition comprises:

at least one Stand-alone Non-public Network (SNPN) identity in the first configuration information belongs to a SNPN selected by the terminal device, or a SNPN registered with by the terminal device, or a SNPN equivalent to the SNPN registered with by the terminal device; and tracking area information associated with the SNPN identity in the first configuration information does not belong to any of access-forbidden tracking area information associated with the terminal device, wherein the access-forbidden tracking area associated with the terminal device is a tracking area associated with the identity of the SNPN selected by the terminal device or the SNPN registered with by the terminal device or the SNPN equivalent to the SNPN registered with by the terminal device.

17. The network device according to claim 16, wherein the first configuration information further comprises at least one of the following:

first indication information indicating whether authentication of the terminal device is allowed to be performed through a third-party network;

first group identity information that allows the authentication of the terminal device to be performed through the third-party network, wherein the group identity information comprises multiple network identities;

third indication information indicating whether the terminal device is allowed to access a cell of a third-party network and obtain subscription information; or second group identity information that allows the terminal device to access the cell of the third-party network and obtain the subscription information, and wherein the granularity of the first indication information, the first group identity information, the third indication information, and the second group identity information is SNPN granularity.

18. The network device according to claim 17, wherein granularity of the PLMN configuration information, the SNPN configuration information, the access control configuration information and the temporary network identity in the first configuration information is cell granularity;

granularity of the first indication information, the first group identity information, the third indication information, the second group identity information, and the fourth indication information is cell granularity, or the granularity of the first indication information, the first group identity information, the third indication information, the second group identity information, and the fourth indication information is PLMN granularity, or the granularity of the first indication information, the first group identity information, the third indication information, the second group identity information and the fourth indication information is SNPN granularity, or the granularity of the first indication information, the first group identity information, the third indication information, the second group identity information, and the fourth indication information is CAG granularity.

19. The network device according to claim 16, wherein the first access condition further comprises at least one of the following:

a radio frequency signal of the cell satisfies S criterion, wherein the S criterion is that receiving power of the radio frequency signal is greater than preset power and quality of the radio frequency signal is greater than preset quality;

the cell allows access; or tracking area information associated with a PLMN network identity in the first configuration information does not belong to any of access-forbidden tracking area information associated with the terminal device, wherein the access-forbidden tracking area associated with the terminal device is a tracking area associated with a network identity of a PLMN selected by the terminal device or a PLMN registered with by the terminal device or a PLMN equivalent to the PLMN registered with by the terminal device, and the PLMN in the first configuration information is the PLMN selected by the terminal device or the PLMN registered with by the terminal device or the PLMN equivalent to the PLMN registered with by the terminal device.

20. The network device according to claim 16, wherein that the cell found through searching belongs to the third-party network comprises:

any network identity included in the first configuration information broadcast by the cell does not match any subscribed network identity maintained by the terminal device.

* * * * *